United States Patent
Lei et al.

(10) Patent No.: US 11,476,980 B2
(45) Date of Patent: Oct. 18, 2022

(54) METHOD AND APPARATUS FOR DETERMINING A HARQ-ACK CODEBOOK FOR CARRIER AGGREGATION

(71) Applicant: LENOVO (BEIJING) LIMITED, Beijing (CN)

(72) Inventors: Haipeng Lei, Beijing (CN); Haiming Wang, Beijing (CN); Zhi Yan, Beijing (CN); Xiaodong Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 28 days.

(21) Appl. No.: 16/961,497

(22) PCT Filed: Jan. 12, 2018

(86) PCT No.: PCT/CN2018/072453
§ 371 (c)(1),
(2) Date: Jul. 10, 2020

(87) PCT Pub. No.: WO2019/136708
PCT Pub. Date: Jul. 18, 2019

(65) Prior Publication Data
US 2020/0344010 A1 Oct. 29, 2020

(51) Int. Cl.
*H04L 1/18* (2006.01)
*H04B 7/0456* (2017.01)
(Continued)

(52) U.S. Cl.
CPC ......... *H04L 1/1819* (2013.01); *H04B 7/0456* (2013.01); *H04L 1/1861* (2013.01); *H04L 5/0055* (2013.01); *H04W 72/0446* (2013.01)

(58) Field of Classification Search
CPC ... H04L 1/1861; H04L 1/1819; H04L 5/0055; H04B 7/0456; H04W 72/0446
See application file for complete search history.

(56) References Cited

U.S. PATENT DOCUMENTS

| 2017/0134140 A1 | 5/2017 | Park |
| 2018/0098345 A1* | 4/2018 | Tiirola ................. H04L 1/1861 |
| 2019/0014560 A1* | 1/2019 | Takeda ................. H04L 1/1861 |

FOREIGN PATENT DOCUMENTS

| CN | 106549734 A | 3/2017 |
| CN | 107104780 A | 8/2017 |

(Continued)

OTHER PUBLICATIONS

PCT/CN2018/072453, "International Search Report and the Written Opinion of the International Search Authority" ISA/CN, State Intellectual Property Office of the P.R. China, Sep. 19, 2018, pp. 1-7.

*Primary Examiner* — Vinncelas Louis
(74) *Attorney, Agent, or Firm* — Kunzler Bean & Adamson

(57) ABSTRACT

The present application is related to a method and apparatus for determining a hybrid automatic repeat request-acknowledge (HARQ-ACK) codebook for carrier aggregation (CA). A method for determining a HARQ-ACK codebook for CA includes receiving a first control signal on a carrier within a carrier group in a slot, wherein the first control signal includes an indicator for indicating whether the carrier is a last scheduled carrier of the carrier group for downlink transmissions. The method further includes transmitting a hybrid automatic repeat request acknowledgement (HARQ-ACK) codebook corresponding to the downlink transmissions in the slot for the carrier group, wherein, based on the first control signal, one or more HARQ-ACK bits for the last scheduled carrier are arranged at the end of the HARQ-ACK codebook. The present application reduces signaling overhead for a HARQ-ACK codebook and avoids misunderstanding between a base unit and a remote unit when determining the HARQ-ACK codebook for CA.

20 Claims, 7 Drawing Sheets

(51) Int. Cl.
*H04L 5/00* (2006.01)
*H04W 72/04* (2009.01)

(56) References Cited

FOREIGN PATENT DOCUMENTS

| CN | 107359969 A | 11/2017 |
|---|---|---|
| WO | 2016162791 A1 | 10/2016 |
| WO | 2017024539 A1 | 2/2017 |

* cited by examiner

METHOD AND APPARATUS FOR DETERMINING A HARQ-ACK CODEBOOK FOR CARRIER AGGREGATION

TECHNICAL FIELD

The present application generally relates to hybrid automatic repeat request-acknowledge (HARQ-ACK) feedback, and more specifically to a HARQ-ACK codebook for carrier aggregation (CA).

BACKGROUND OF THE INVENTION

In 3GPP LTE (Long Term Evolution) Release 10, a solution of CA is introduced which enables two or multiple component carriers to be used together to provide high data transmission rates required for LTE Advanced.

In wireless communication technology, HARQ-ACK feedback technology is commonly used during data transmission, so as to feedback whether data was correctly received in the downlink (DL) or uplink (UL) transmission. HARQ-ACK represents collectively the Positive Acknowledgement (ACK) and the Negative Acknowledgement (NACK). ACK means data was correctly received while NACK means data was erroneously received or missing. For HARQ-ACK feedback information (which may be called a HARQ-ACK codebook, for example), the HARQ-ACK codebook size is usually preconfigured and/or determined during transmission.

However, in some cases, when a HARQ-ACK codebook consists of HARQ-ACK bits corresponding to multiple DL or UL resources for multiple carriers in carrier domain and/or time domain for CA, issues on the HARQ-ACK codebook determination, especially the size of the HARQ-ACK codebook needs to be solved, to avoid any misunderstanding between a base unit and a remote unit during data transmission.

Thus, a manner of determining a HARQ-ACK codebook used for multiple DL or UL resources for multiple carriers in carrier domain and/or time domain for CA is desirable.

BRIEF SUMMARY OF THE INVENTION

One objective of the present application is to provide a manner of determining a HARQ-ACK codebook used for multiple DL or UL resources for multiple carriers in carrier domain and/or time domain for CA.

One embodiment of the present application provides an apparatus. The apparatus includes a receiver that receives a first control signal on a carrier within a carrier group in a slot. The first control signal includes an indicator for indicating whether the carrier is a last scheduled carrier of the carrier group for downlink transmissions. The apparatus further includes a transmitter that transmits a hybrid automatic repeat request acknowledgement (HARQ-ACK) codebook corresponding to the downlink transmissions in the slot for the carrier group. Based on the first control signal, one or more HARQ-ACK bits for the last scheduled carrier are arranged at the end of the HARQ-ACK codebook.

Another embodiment of the present application provides an apparatus. The apparatus includes a transmitter that transmits a first control signal on a carrier within a carrier group in a slot. The first control signal includes an indicator for indicating whether the carrier is a last scheduled carrier of the carrier group for downlink transmissions. The apparatus further includes a receiver that receives a hybrid automatic repeat request acknowledgement (HARQ-ACK) codebook corresponding to the downlink transmissions in the slot for the carrier group. Based on the first control signal, one or more HARQ-ACK bits for the last scheduled carrier are arranged at the end of the HARQ-ACK codebook.

Yet another embodiment of the present application also provides a method. The method includes receiving a first control signal on a carrier within a carrier group in a slot. The first control signal includes an indicator for indicating whether the carrier is a last scheduled carrier of the carrier group for downlink transmissions. The method further includes transmitting a hybrid automatic repeat request acknowledgement (HARQ-ACK) codebook corresponding to the downlink transmissions in the slot for the carrier group. Based on the first control signal, one or more HARQ-ACK bits for the last scheduled carrier are arranged at the end of the HARQ-ACK codebook.

A further embodiment of the present application also provides a method. The method includes transmitting a first control signal on a carrier within a carrier group in a slot. The first control signal includes an indicator for indicating whether the carrier is a last scheduled carrier of the carrier group for downlink transmissions. The method further includes receiving a hybrid automatic repeat request acknowledgement (HARQ-ACK) codebook corresponding to the downlink transmissions in the slot for the carrier group. Based on the first control signal, one or more HARQ-ACK bits for the last scheduled carrier are arranged at the end of the HARQ-ACK codebook.

Embodiments according to the present application can reduce signaling overhead for a HARQ-ACK codebook and avoid misunderstanding between a base unit and a remote unit when determining the HARQ-ACK codebook for CA.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only example embodiments of the present application and are not therefore to be considered as limiting of its scope.

DETAILED DESCRIPTION OF THE INVENTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments of the present application provide methods and apparatuses for HARQ-ACK codebook determination for CA. To facilitate understanding, embodiments of the present application are provided under specific network architecture and new service scenarios, such as 3GPP 5G NR (new radio), 3GPP LTE (Long Term Evolution) Release 8 and onwards. Persons skilled in the art are well-aware that, with developments of network architecture and new service scenarios, the embodiments in the subject disclosure are also applicable to similar technical problems.

Figure 1:
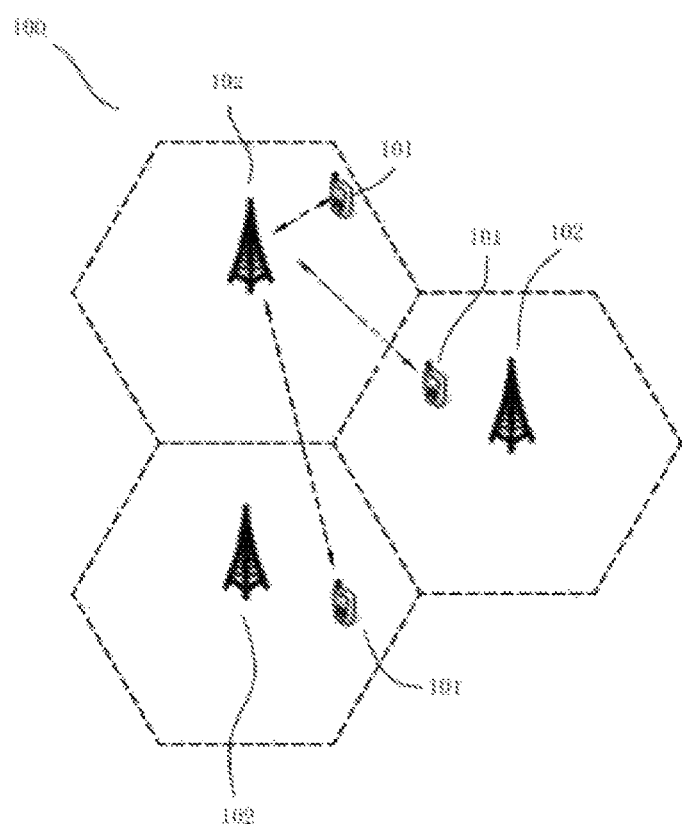
FIG. 1 illustrates an example block diagram of a wireless communication system according to an embodiment of the present application.

FIG. 1 illustrates an example block diagram of a wireless communication system according to an embodiment of the present application. As shown in FIG. 1, the wireless communication system 100 includes remote units 101 and base units 102. Even though a specific number of remote units 101 and base units 102 are depicted in FIG. 1, persons skilled in the art will recognize that the number of remote units 101 and the number of base units 102 in the wireless communication system 100 may change.

The remote units 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present application, the remote units 101 may include a portable wireless communication device, a smart phone, a cellular telephone, a flip phone, a device having a subscriber identity module, a personal computer, a selective call receiver, or any other device that is capable of sending and receiving communication signals on a wireless network. In an embodiment, the remote units 101 include wearable devices, such as smart watches, fitness bands, optical head-mounted displays, or the like. Moreover, the remote units 101 may be referred to as subscriber units, mobiles, mobile stations, users, terminals, mobile terminals, wireless terminals, fixed terminals, subscriber stations, UE, user terminals, a device, or by other terminology used in the art. The remote units 101 may communicate directly with a base unit 102 via uplink or downlink communication signals.

The base units 102 may be distributed over a geographic region. In certain embodiments, a base unit 102 may also be referred to as an access point, an access terminal, a base, a base station, a macro cell, a Node-B, an enhanced Node B (eNB), a gNB, a Home Node-B, a relay node, a device, or by any other terminology used in the art. The base units 102 are generally part of a radio access network that may include one or more controllers communicably coupled to one or more corresponding base units 102.

The base units 102 are generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more base units 102 may be communicably coupled to a mobility management entity (MME), a serving gateway (SGW), and/or a packet data network gateway (PGW).

The base units 102 may serve a number of remote units 101 within a serving area, for example, a cell or a cell sector via a wireless communication link. The base units 102 may communicate directly with one or more of the remote units 101 via communication signals. For example, a base unit 102 may serve remote units 101 within a macro cell.

The base units 102 transmits downlink (DL) communication signals to serve the remote units 101 in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the remote units 101 and the base units 102.

The wireless communication system 100 is compliant with any type of network that is capable of sending and receiving wireless communication signals. For example, the wireless communication system 100 is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system 100 is compliant with the long-term evolution (LTE) of the 3GPP protocol, wherein the base unit 102 transmits using an orthogonal frequency division multiplexing (OFDM) modulation scheme on the DL and the remote units 101 transmit on the UL using a single-carrier frequency division multiple access (SC-FDMA) scheme or OFDM scheme. More generally, however, the wireless communication system 100 may implement some other open or proprietary communication protocol, for example, WiMAX, among other protocols.

In other embodiments, the base unit 102 may communicate using other communication protocols, such as the IEEE 802.11 family of wireless communication protocols. Further, in an embodiment, the base unit 102 may communicate over licensed spectrum, while in other embodiments the base unit 102 may communicate over unlicensed spectrum. The present disclosure is not intended to be limited to the implementation of any particular wireless communication system architecture or protocol. In another embodiment, the base unit 102 may communicate with remote units 101 using the 3GPP 5G protocols.

According to an embodiment of the present application, downlink (DL) transport blocks (TBs) are carried on the Physical Downlink Shared Channel (PDSCH). The HARQ-ACK feedback bits corresponding to the PDSCH are transmitted either on the Physical Uplink Control Channel (PUCCH) or on the Physical Uplink Shared Channel (PUSCH). A maximum of two TBs can be transmitted in one PDSCH in one serving cell and in one slot. One TB includes a plurality of code blocks, several code blocks in a TB are grouped into one code block group (CBG), and each code block within a code block group is independently decodable. That is, a TB includes a plurality of CBGs. The number of code blocks within one CBG, i.e., CBG size, varies according to the TB size. The maximum number of CBGs per TB is configured by Radio Resource Control (RRC) signaling. Furthermore, in single codeword (CW) configuration, the maximum configurable number of CBGs per TB is 8, the possible max number of CBGs per TB is 2, 4, 6, or 8; and in multiple CW configuration, the maximum configurable number of CBGs per TB is 4, and the configured maximum number of CBGs per TB is the same between TBs.

Regarding the solution of CA used in 3GPP 5G NR (which may be called NR CA, for example), a 3GPP standard document named "NR Spec TS38.213" under3GPP 5G NR specifies a semi-static HARQ-ACK codebook and a dynamic HARQ-ACK codebook for CA NR. More particularly, a3GPP standard document named "NR SpecTS38.213-200" under3GPP 5G NR specifies a semi-static HARQ-ACK codebook size determination as "Type 1 HARQ-ACK codebook determination" and specifies a dynamic HARQ-ACK codebook size determination as "Type 2 HARQ-ACK codebook determination." In3GPP RAN1 #91, agreements of generating two HARQ-ACK sub-codebooks (sub-CBs) is made, wherein the first sub-CB includes TB-based HARQ-ACK (which may also be called TB-level HARQ-ACK) feedback, the second sub-CB includes CBG-based HARQ-ACK (which may also be called CBG-level HARQ-ACK) feedback, and the sub-CBs are combined in a single HARQ-ACK codebook (sub-CB for TB-based HARQ-ACK is placed first) to be transmitted between a base unit and a remote unit.

Although semi-static HARQ-ACK codebook can lead to large overhead, it can guarantee a base unit and a remote unit have the same knowledge on the HARQ-ACK codebook size. In contrast, dynamic HARQ-ACK codebook in the3GPP standard document named "NR Spec TS38.213-200" is not fully dynamic, because CBG-level HARQ-ACK for each TB is mapped to the RRC configured maximum number of CBGs per TB across all the carriers configured with CBG-based retransmission.

Counter downlink assignment index (DAI) and total DAI are specified in LTE Rel-13 eCA (enhanced Carrier Aggregation). To realize fully dynamic HARQ-ACK codebook, an index(s), such as, CBG-level DAI(s), may be specified. In this way, the HARQ-ACK codebook can have the least signaling overhead and guarantee the same knowledge on HARQ-ACK codebook size between both a base unit and a remote unit. However, in case the maximum number of CBGs per TB is set to the maximum value of 8, generally, CBG-level DAI(s) including both five bits counter DAI (C-DAI) and five bits total DAI (T-DAI) needs to be specified, in order to detect the probability of two back-to-back slot missing. One objective of the subject invention is to reduce the overhead of CBG-level DAIs (five bits counter DAI and five bits total DAI).

For the dynamic HARQ-ACK codebook for multiple DL or UL resources for multiple carriers in carrier domain and/or time domain for CA, without CBG-level DAI(s), ambiguity problem on HARQ-ACK codebook size between a remote unit and a base unit may be caused.

According to an embodiment of the present application, the dynamic HARQ-ACK codebook is divided into two sub-codebooks. Wherein the first sub-codebook is for TB-based HARQ-ACK for one or more carriers configured with TB-based retransmission. The second sub-codebook is for CBG-based HARQ-ACK for one or more carriers configured with CBG-based retransmission. In one embodiment, after generating two sub-codebooks, the second sub-codebook is appended to the end of the first sub-codebook, so that a single HARQ-ACK codebook is transmitted from a remote unit to a base unit.

According to an embodiment of the present application, configured carriers are grouped into two carrier groups. For example, a first carrier group consists of carriers configured with TB-based retransmission, and HARQ-ACK feedback corresponding to the first carrier group is mapped to a first HARQ-ACK sub-codebook; and a second carrier group consists of carriers configured with CBG-based retransmission, and HARQ-ACK feedback corresponding to the second carrier group is mapped to a second HARQ-ACK sub-codebook. In one embodiment, the first sub-codebook is appended to the end of the second sub-codebook, to form a final single HARQ-ACK codebook for transmission in a single slot. In another embodiment, the second sub-codebook is appended to the end of the first sub-codebook, to construct a final single HARQ-ACK codebook for transmission in a single slot.

According to a further embodiment of the present application, in response to one or more carriers in a specific carrier group are scheduled in a plurality of slots, a plurality of HARQ-ACK codebooks for a plurality of slots for one carrier group are concatenated to form a single HARQ-ACK codebook for transmission in one channel from a remote unit to a base unit.

In another embodiment of the present application, in response to a plurality of carriers are scheduled in a plurality of slots and these carriers are grouped into two carrier groups, a plurality of HARQ-ACK codebooks corresponding to carrier(s) for a plurality of slots for a first carrier group are concatenated to form a first HARQ-ACK codebook, a plurality of HARQ-ACK codebooks corresponding to carrier(s) for a plurality of slots for a second carrier group are concatenated to form a second HARQ-ACK codebook, and then the first HARQ-ACK codebook and the second HARQ-ACK codebook are concatenated to form a final single HARQ-ACK codebook for transmission in one channel from a remote unit to a base unit.

In another embodiment of the present application, in response to a plurality of carriers are scheduled in one slot and these carriers are grouped into two carrier groups, a first HARQ-ACK codebook corresponds to carrier(s) for the slot for a first carrier group, a second HARQ-ACK codebook corresponds to carrier(s) for the slot for a second carrier group, and the first and second HARQ-ACK codebooks are concatenated to form a final single HARQ-ACK codebook for transmission in one channel from a remote unit to a base unit.

In an embodiment of the present application, in response to a carrier group includes one or more carriers, a downlink transmission on each carrier within the carrier group is mapped to the same number of HARQ-ACK bits in a HARQ-ACK codebook. For example, in response to a carrier group includes three carriers and each carrier within this carrier group is configured with TB-based retransmission, a downlink transmission on each carrier is mapped to one HARQ-ACK bit in a HARQ-ACK codebook, and downlink transmissions on all these three carriers are mapped to three HARQ-ACK bits in the HARQ-ACK codebook. In other words, the HARQ-ACK codebook includes three HARQ-ACK bits corresponding to downlink transmissions on three TBs of three carriers within the carrier group.

For another example, in response to a carrier group includes two carriers and each carrier within this carrier group is configured with CBG-based retransmission, in case the maximum number of CBGs per TB is set to 8, a downlink transmission on each carrier is mapped to 8 HARQ-ACK bits in a HARQ-ACK codebook, and downlink transmissions on these two carriers are mapped to 16 HARQ-ACK bits (2*8=16) in the HARQ-ACK codebook. In other words, the HARQ-ACK codebook includes 16 HARQ-ACK bits corresponding to downlink transmissions on 16 CBGs of two carriers within the carrier group.

According to an embodiment of the present application, for determining a HARQ-ACK codebook for CA, a last carrier indicator/indication (LCI) may be introduced into control information of data transmission(s). For an example, the LCI may be introduced into downlink control information (DCI) for downlink transmissions. The LCI is used to indicate whether the current carrier is the last scheduled carrier of the current carrier group in the current slot, so that a remote unit can synchronize the dynamic HARQ-ACK codebook size with a base unit.

Figure 2:
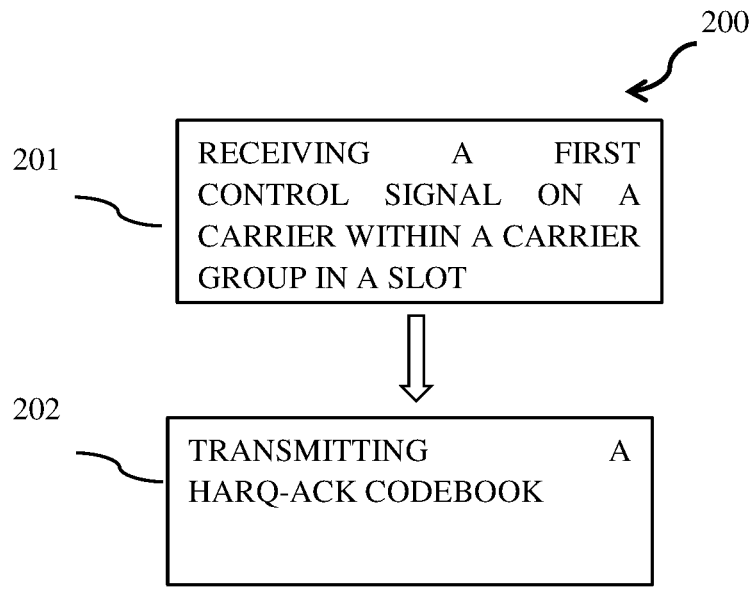
FIG. 2 illustrates an example flowchart demonstrating the operations of a remote unit according to an embodiment of the present application.

FIG. 2 illustrates an example flowchart demonstrating the operations of a remote unit according to an embodiment of the present application. In an embodiment of the present application, the method 200 is performed by an apparatus, such as the remote units 101. In certain embodiments of the present application, the method 200 may be performed by a processor executing program codes, for example, a microcontroller, a microprocessor, a CPU, a GPU, an auxiliary processing unit, a FPGA, or the like.

In step 201 of FIG. 2, a first control signal on a carrier within a carrier group in a slot is received. The first control signal includes an indicator for indicating whether the carrier transmitting the first control signal is the last scheduled carrier of the carrier group for downlink transmissions. In step 202 of FIG. 2, a HARQ-ACK codebook corresponding to the downlink transmissions in the slot for the carrier group is transmitted. Such HARQ-ACK codebook is determined based on the first control signal.

In an embodiment of the present application, the indicator included in the first control signal is the LCI, which indicates whether the carrier transmitting the first control signal is the last scheduled carrier of the current carrier group including the carrier in the current slot. Further, in an example, each carrier transmits a first control signal to indicate whether this carrier is the last scheduled carrier of the carrier group to which this carrier belongs.

According to an embodiment of the present application, one bit in DL assignment is used as LCI. For instance, "1" of the bit represents the current carrier is the last scheduled carrier within the current carrier group in the current slot; whereas "0" of the bit represents the current carrier is not the last scheduled carrier within the current carrier group in the current slot.

In an embodiment of the present application, a LCI bit may be carried in each DL assignment. In this case, after receiving the LCI bit, a remote unit can know whether the current carrier is the last scheduled carrier within the current carrier group in the current slot. In response to only one carrier group including one or more carriers is scheduled in one slot, after receiving a LCI bit which indicates that the current carrier is the last scheduled carrier within the carrier group in the current slot, a HARQ-ACK codebook corresponding to all carrier(s) in the carrier group in the current slot may be generated. For instance, in response to a carrier group including two carriers is scheduled in one slot and each carrier within this carrier group is configured with TB-based retransmission, after receiving a LCI bit which indicates that the current carrier is the last scheduled carrier within the carrier group in the current slot, a HARQ-ACK codebook, which includes two HARQ-ACK bits corresponding to downlink transmissions on two TBs of two carriers within the carrier group in the current slot, may be generated and then transmitted in one channel.

For another example, in response to a carrier group including two carriers is scheduled in one slot and each carrier within this carrier group is configured with CBG-based retransmission, in case the maximum number of CBGs per TB is set to 8, a downlink transmission on each carrier is mapped to 8 HARQ-ACK bits in a HARQ-ACK codebook, and downlink transmissions on these two carriers are mapped to 16 HARQ-ACK bits (2*8=16) in the HARQ-ACK codebook. In other words, the HARQ-ACK codebook includes 16 HARQ-ACK bits corresponding to downlink transmissions on 16 CBGs of two carriers within the carrier group.

Figure 3:
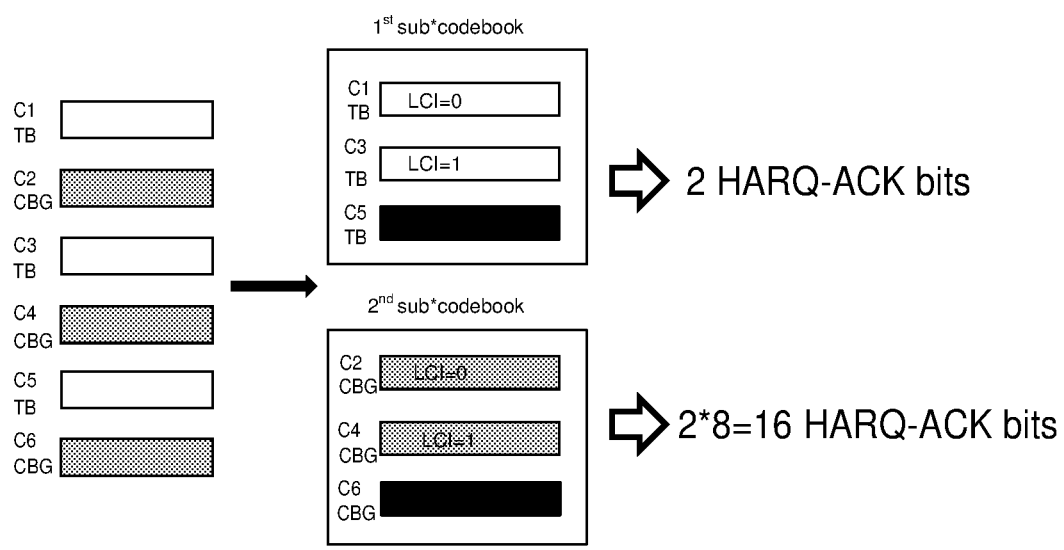
FIG. 3 illustrates an example of generating bits in a HARQ-ACK codebook according to an embodiment of the present application.

FIG. 3 illustrates an example of generating bits in a HARQ-ACK codebook according to an embodiment of the present application. As shown in FIG. 3, six carriers are configured to a remote unit indexed from C1 to C6, wherein C1, C3 and C5 are configured with TB-level retransmission while C2, C4 and C6 are configured with CBG-level retransmission. So a first carrier group can consist of C1, C3, and C5, and a second carrier group can consist of C2, C4 and C6. Other configurations of carriers with TB-level or CBG-level retransmissions may be applied in the embodiment of FIG. 3.

For CBG-based retransmission, different carriers may be configured with different maximum number of CBGs per TB. Each TB is mapped to the maximum number of HARQ-ACK bits across all the carriers configured with CBG-based retransmission. According to one example, the maximum number of CBGs per TB across all the carriers configured with CBG-based retransmission is 8, and thus each TB on the CBG-based carrier is mapped to 8 HARQ-ACK bits regardless of the actually configured CBG number.

As shown in FIG. 3, C1, C2, C3 and C4 are scheduled in one slot while C5 and C6 are not scheduled. According to one embodiment, firstly, the $1^{st}$ sub-codebook is generated for the TB-based carriers, carriers within the first carrier group; then, the $2^{nd}$ sub-codebook is generated for the CBG-based carriers, carriers within the second carrier group. According to the embodiment of FIG. 3, the maximum number of CBGs per TB across all the carriers in the second carrier group is configured as 8.

In another embodiment of the present application, one or more HARQ-ACK bits for the last scheduled carrier are arranged at the end of the HARQ-ACK codebook.

With reference to the example in FIG. 3, after receiving all LCIs transmitted in one or more carrier groups in the DL transmissions, a remote unit can determine the last scheduled carriers in the one or more carrier groups, and then, HARQ-ACK bits corresponding to the received carriers may be fed back to a base unit. For example, in response to no transmission missing, a remote unit receives LCI=0 for C1, LCI=1 for C3, LCI=0 for C2, and LCI=1 for C4, and thus, the remote unit determines that all the scheduled carriers in the first and second carrier groups are received. After that, the remote unit can determine that the $1^{st}$ sub-codebook includes 2 HARQ-ACK bits, which correspond to downlink transmissions on two TBs of C1 and C3 within the first carrier group in the current slot; and the $2^{nd}$ sub-codebook includes 16 HARQ-ACK bits, which correspond to downlink transmissions on 16 CBGs of C2 and C4 within the second carrier group in the current slot. Specifically, since the maximum number of CBGs per TB across C2 and C4 is 8, the total number of HARQ-ACK bits in the $2^{nd}$ sub-codebook is 2*8=16. Given this, a HARQ-ACK codebook including the $1^{st}$ sub-codebook and the $2^{nd}$ sub-codebook is generated by a remote unit. In one example, in the HARQ-ACK codebook, the $2^{nd}$ sub-codebook having 16 HARQ-ACK bits corresponding to C2 and C4 is appended to the end of the $1^{st}$ sub-codebook having 2 HARQ-ACK bits corresponding to C1 and C3. Once the HARQ-ACK codebook including 18 HARQ-ACK bits (2+16=18) is transmitted from the remote unit to a base unit, the base unite may determine the decoding status of all the scheduled carriers in the first and second carrier groups.

Figure 4:
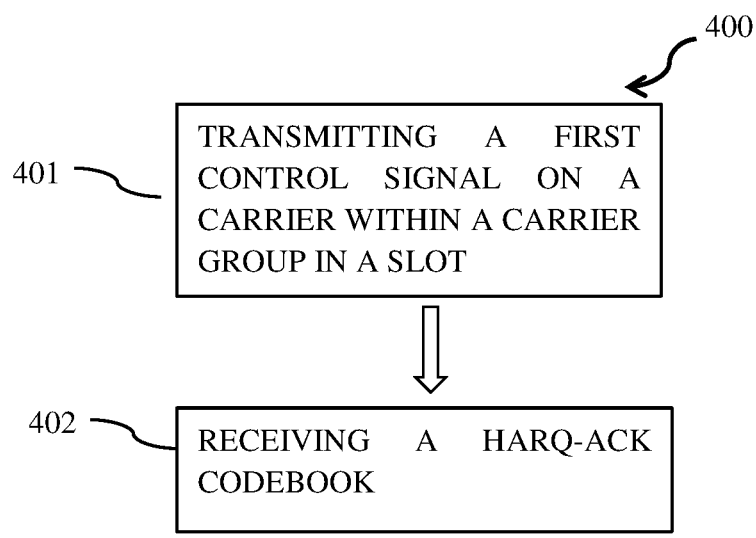
FIG. 4 illustrates an example flowchart demonstrating the operations of a base unit according to an embodiment of the present application.

FIG. 4 illustrates an example flowchart demonstrating the operations of a base unit according to an embodiment of the present application. In an embodiment of the present application, the method 400 is performed by an apparatus, such as the base units 102. In certain embodiments, the method 400 may be performed by a processor executing program codes, for example, a microcontroller, a microprocessor, a CPU, a GPU, an auxiliary processing unit, a FPGA, or the like.

In step 401 of FIG. 4, a first control signal is transmitted on a carrier within a carrier group in a slot. Wherein the first control signal includes an indicator for indicating whether the carrier is a last scheduled carrier of the carrier group for downlink transmissions. In one example, the indicator included in the first control signal is the LCI, which indicates whether the carrier transmitting the first control signal is the last scheduled carrier of the current carrier group in the current slot. In a further example, each carrier transmits a first control signal to indicate whether this carrier is the last scheduled carrier of the carrier group to which this carrier belongs. In step 402 of FIG. 4, a HARQ-ACK codebook corresponding to the downlink transmissions in the slot for the carrier group is received. Based on the first control signal, one or more HARQ-ACK bits for the last scheduled carrier are arranged at the end of the HARQ-ACK codebook. All the implementations or embodiment in HARQ-ACK codebook determination mentioned in descriptions of the present application are applicable for this embodiment.

As mentioned above, the traditional Type-2 HARQ-ACK codebook size determination utilizes five-bit C-DAI and five-bit T-DAI in case the maximum number of CBGs per TB is set to the maximum value of 8. In the above-mentioned embodiment, a one-bit indicator, Last Carrier Indication (LCI), is included in the DCI for each carrier, so as to indicate whether the current carrier is the last scheduled carrier of the current carrier group in the current slot. Upon reception of a LCI for each scheduled carrier, a remote unit may determine the HARQ-ACK codebook size correctly. However, once a scheduled carrier carrying LCI is missing, the number of carriers received by a remote unit is less than a total number of actually scheduled carriers, and thus LCI(s) identified by the remote unit cannot reflect all the actually scheduled carriers. Accordingly, the HARQ-ACK codebook size determined by the remote unit according to the LCI(s) is incorrect. This causes ambiguity on HARQ-ACK codebook size between a base unit and a remote unit. Based on this, a preferred embodiment of the subject invention applies both LCI and T-DAI in DCI, so as to correctly determine the HARQ-ACK codebook size even one scheduled carrier including the DCI is missing. In an example, one-bit LCI and one-bit T-DAI may be used in the DCI in the preferred embodiment. In a further example, one-bit LCI and two-bit T-DAI may be used in the DCI in the preferred embodiment.

According to one embodiment of the subject application, separate T-DAI may be used separate sub-codebook. For example, T-DAI indicating a total number of carrier(s) in a first carrier group is transmitted on each of one or more carriers in the first carrier group and used for generating $1^{st}$ sub-codebook, and T-DAI indicating a total number of carrier(s) in a second carrier group is transmitted on each of one or more carriers in the second carrier group and used for generating $2^{nd}$ sub-codebook.

Alternatively, in a preferred embodiment, unified T-DAI may be used for separate sub-codebooks, wherein the value of T-DAI in DL assignment is a total number of carriers scheduled for all carrier groups. For instance, the value of T-DAI in DL assignment denotes a total number of PDCCH(s) within a downlink association set. For a further example, the value of T-DAI is updated from one slot to next slot within the downlink association set. For the PDCCHs transmitted in the same slot within the same downlink association set, the value of T-DAI in DL transmissions is exactly same. The value of T-DAI is modular with $2^n$, wherein n is the number of bits for indicating the T-DAI.

Figure 5:
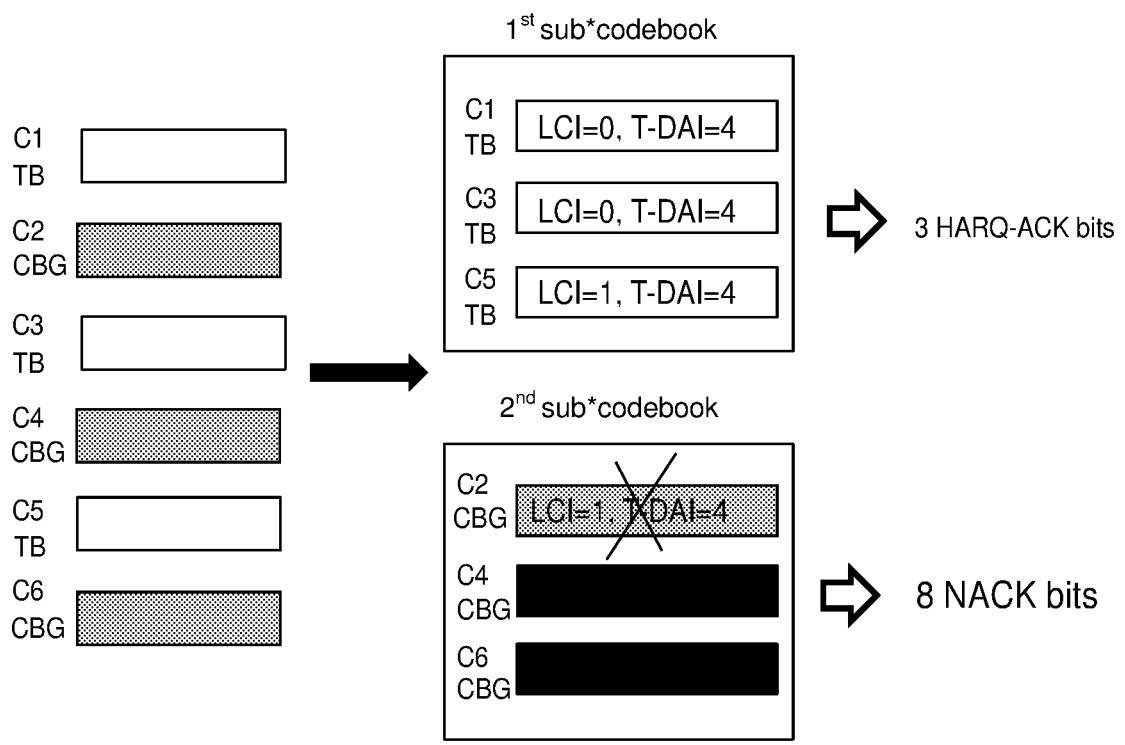
FIG. 5 illustrates an example of generating bits in a HARQ-ACK codebook according to another embodiment of the present application.

FIG. 5 illustrates an example of generating bits in a HARQ-ACK codebook according to another embodiment of the present application. Similar to FIG. 3, six carriers shown in FIG. 5 are configured to a remote unit indexed from C1 to C6, wherein C1, C3 and C5 are configured with TB-level retransmission and included in a first carrier group while C2, C4 and C6 are configured with CBG-level retransmission and included in a second carrier group. Other configurations of carriers with TB-level or CBG-level retransmissions may also be applied in the embodiment of FIG. 5.

As shown in FIG. 5, C1, C2, C3 and C5 are scheduled in one slot while C4 and C6 are not scheduled. Since four carriers are actually scheduled, T-DAI in DCI for each carrier is indicated with "4".

According to implementations of LCI described above, in response to one bit is used for LCI, as shown in FIG. 5, in the first carrier group, LCI for C1 and LCI for C3 are indicated with "0" to indicate that C1 and C3 are not the last scheduled carrier of the first carrier group, and LCI for C5 is indicated with "1" to indicate that C5 is the last scheduled carrier of the first carrier group; and in the second carrier group, LCI for C2 is indicated with "1" to indicate that C2 is the last scheduled carrier of the second carrier group.

In the case that a scheduled carrier is missing, a remote unit may identify which carrier is missed with the help of total DAI (T-DAI) and LCI in DCI in multiple scenarios. For example, in the case that C2 in the second carrier group is missing, as shown in $2^{nd}$ sub-codebook of FIG. 5, a remote unit received and decoded 3 carriers in the first carrier group, C1, C3, and C5, with the help of LCIs transmitted on these carriers; since the remote unit identifies that all T-DAIs transmitted on C1, C3, and C5 are equal to 4, whereas the number of carriers received by a remote unit is 3, which is less than 4, the remote unit determines that one carrier is missed from the DL transmissions. Moreover, since LCI for C5 indicated with "1" indicates that C5 is the last scheduled carrier of the first carrier group, as shown in $1^{st}$ sub-codebook of FIG. 5, the remote unit can determine that all carriers in the first carrier group are received and thus the missed carrier belongs to the second carrier group.

After that, the remote unit can determine that the $1^{st}$ sub-codebook includes 3 HARQ-ACK bits, which correspond to downlink transmissions on three TBs of C1, C3, and C5 within the first carrier group in the current slot; and since the remote unit knows that the maximum number of CBGs per TB across carrier(s) in the second carrier group is 8, the $2^{nd}$ sub-codebook includes 8 NACK bits, which correspond to downlink transmissions on 8 CBGs of the missed C2 within the second carrier group in the current slot. Given this, a HARQ-ACK codebook including the $1^{st}$ sub-codebook and the $2^{nd}$ sub-codebook is generated by a remote unit. In one example, in the HARQ-ACK codebook, the $2^{nd}$ sub-codebook is appended to the end of the $1^{st}$ sub-codebook. Once the HARQ-ACK codebook including 3 HARQ-ACK bits and 8 NACK bits is transmitted from the remote unit to a base unit, the base unite may determine from 8 NACK bits that the only one carrier in the second carrier group, i.e., C2, is erroneously decoded by the remote unit. Then, the base unit may retransmit C2 for the remote unit in DL transmissions.

Under a certain scenario, the implementation of applying both LCI and T-DAI in DCI cannot correctly determine the HARQ-ACK codebook size when some carrier is missing. For example, if the C3 is not scheduled, the T-DAI for all carriers should be 3. While the C2 is missed again, the remote unit cannot determine whether C2 or C3 is missing. Since carrier 2 and carrier 3 correspond to different number of HARQ-ACK feedback bits, this error case causes ambiguity between a base unit and a remote unit on a HARQ-ACK codebook.

According to another embodiment of the subject application, a preferred embodiment of the subject invention applies all LCI, C-DAI, and T-DAI in DCI, so as to correctly determine a HARQ-ACK codebook size when some scheduled carrier(s) is missing. In an example, one-bit LCI, one-bit T-DAI and one-bit C-DAI may be used in the DCI in the preferred embodiment. In a further example, one-bit LCI, two-bit T-DAI and two-bit C-DAI may be used in the DCI in the preferred embodiment. According to one embodiment of the subject application, unified C-DAI may be used for separate sub-codebook. Alternatively, in a preferred embodiment, separate C-DAI may be used for separate sub-codebooks, wherein the value of C-DAI in DL assignment is an accumulative number of carriers for downlink transmissions for each carrier groups.

Figure 6:
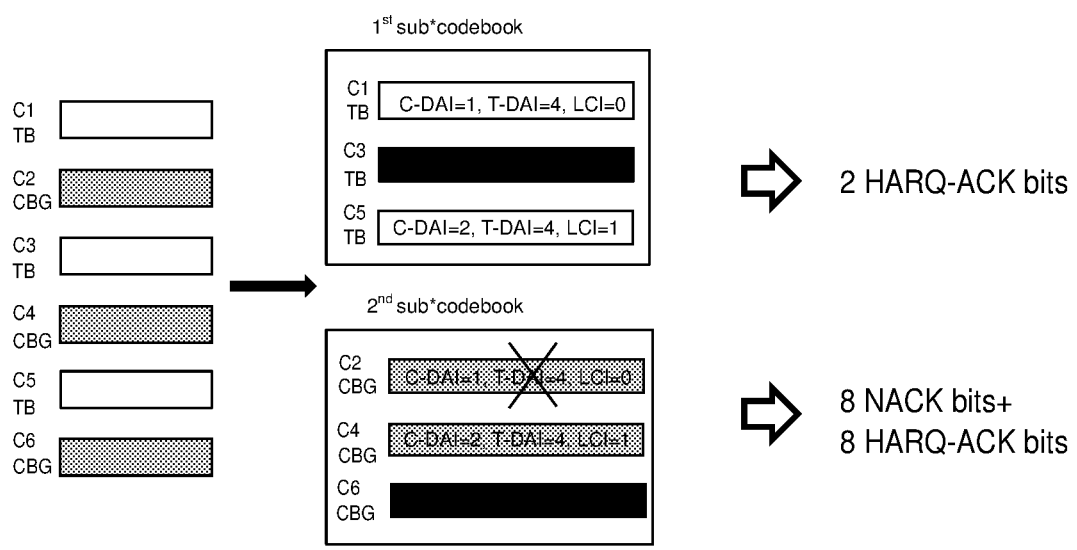
FIG. 6 illustrates an example of generating bits in a HARQ-ACK codebook according to a further embodiment of the present application.

FIG. 6 illustrates a further example of generating HARQ-ACK bits in HARQ-ACK codebook according to another embodiment of the present application. As shown in FIG. 6, six carriers are configured to a remote unit indexed from C1 to C6, wherein C1, C3 and C5 are configured with TB-level retransmission and included in a first carrier group while C2, C4 and C6 are configured with CBG-level retransmission and included in a second carrier group. As shown in FIG. 6, C1, C2, C4 and C5 are scheduled in one slot while C3 and C6 are not scheduled. Similar to the embodiment of FIG. 3, firstly, the $1^{st}$ sub-codebook is generated for the TB-based carriers then the $2^{nd}$ sub-codebook is generated for the CBG-based carriers.

Separate C-DAI is used for the first carrier group or the second carrier group, wherein a value of the C-DAI denotes an accumulative number of carriers for downlink transmissions in the slot and in the first carrier group or in the second carrier group. Moreover, the C-DAI is used to order HARQ-ACK bits within a HARQ-ACK codebook. Unified T-DAI is used for both the first and second carrier groups, wherein a value of the T-DAI denotes a total number of carriers for downlink transmissions in the slot across both the first and second carrier groups. In other words, C-DAI is updated per carrier group and total DAI is the total number of scheduled carriers within current slot. LCI is indicated per carrier group for the current slot.

As depicted in FIG. 6, PDCCH on C2 is missed. With the help of C-DAI and LCI on C1 and C5, a remote unit knows C5 is the last scheduled carrier within the first carrier group and no other carrier in the first carrier group is missing, so the remote unit may generate two HARQ-ACK bits for C1 and C5, to generate for the $1^{st}$ sub-codebook; with the help of T-DAI on C1 and C5, the remote unit knows there are two carriers scheduled in second carrier group, however, only one carrier, C4, is correctly decoded by the remote unit; with the help of LCI on C4, the remote unit knows C4 is the last scheduled carrier within the second carrier group, and thus the remote unit may definitely determine that C2 is missed. Without the help of C-DAI, the remote unit cannot determine whether C2 or C3 is missing. Based on the above, the remote unit may generate 8 NACK bits for C2 and 8 HARQ-ACK bits for C4, to generate for the $2^{nd}$ sub-codebook, in response to the RRC configured maximum number of CBGs per TB on $2^{nd}$ carrier group is 8. Given this, the remote unit may determine a final HARQ-ACK codebook according to the $1^{st}$ and $2^{nd}$ sub-codebooks, and moreover, the remote unit may clearly determine which carrier in the carrier group is missed. In other words, the same HARQ-ACK codebook size including the sub-codebook size can be guaranteed between a base unit and a remote unit.

Figure 7:
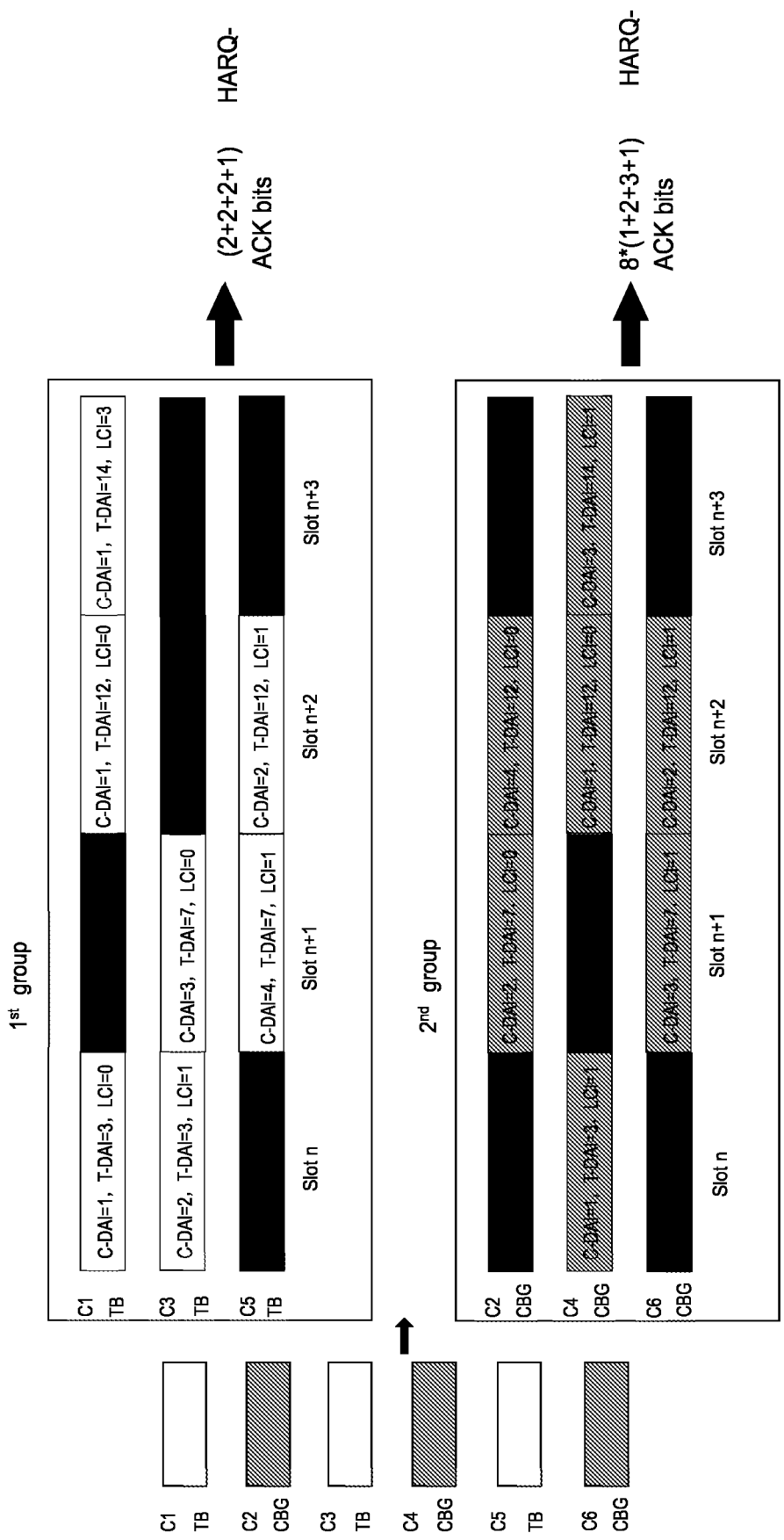
FIG. 7 illustrates an example of generating bits in a HARQ-ACK codebook according to a further embodiment of the present application.

FIG. 7 illustrates an example of generating bits in HARQ-ACK codebook according to a further embodiment of the present application. In particular, FIG. 7 shows a codebook size determination for multiple slots according to a preferred embodiment of the subject invention. In this preferred embodiment, a HARQ-ACK codebook is generated, but not limited to, per four slots. To solve the error case in multi-slot transmission, according to the preferred embodiment, C-DAI denotes an accumulative number of carriers for downlink transmissions in the current carrier group and is set to 1 for the first carrier in each slot, and T-DAI denotes the total number of carriers for downlink transmissions across different carrier groups in the current slot and is accumulated slot by slot. As depicted in FIG. 7, a HARQ-ACK codebook for the downlink transmissions on two carrier groups across four slots is formed by: forming a $1^{st}$ sub-codebook by concatenating the HARQ-ACK bits for TB-based retransmission for each slot; forming a $2^{nd}$ sub-codebook by concatenating the HARQ-ACK bits for CBG-based for each slot; and then concatenating the $1^{st}$ sub-codebook and the $2^{nd}$ sub-codebook. Thus, the size of the HARQ-ACK codebook of the example shown in FIG. 7 is 63-bit while the $1^{st}$ sub-codebook includes 7 bits and the $2^{nd}$ sub-codebook includes 56 bits, and the HARQ-ACK codebook can be transmitted in one channel.

In the above embodiments, the carriers with index of odd number are TB-based retransmission and the carriers with index of even number are CBG-based retransmission. However, other configurations for carriers being TB-based retransmission or CBG-based retransmission are also applicable for all the above embodiments of the subject application. Furthermore, configurations for carriers in DL transmission other than TB-based retransmission or CBG-based retransmission (e.g. other data unit level retransmission) are also applicable for all the above embodiments of the subject application. Moreover, a remote unit and a base unit can know which carrier is configured in which level and grouped into which group.

Figure 8:
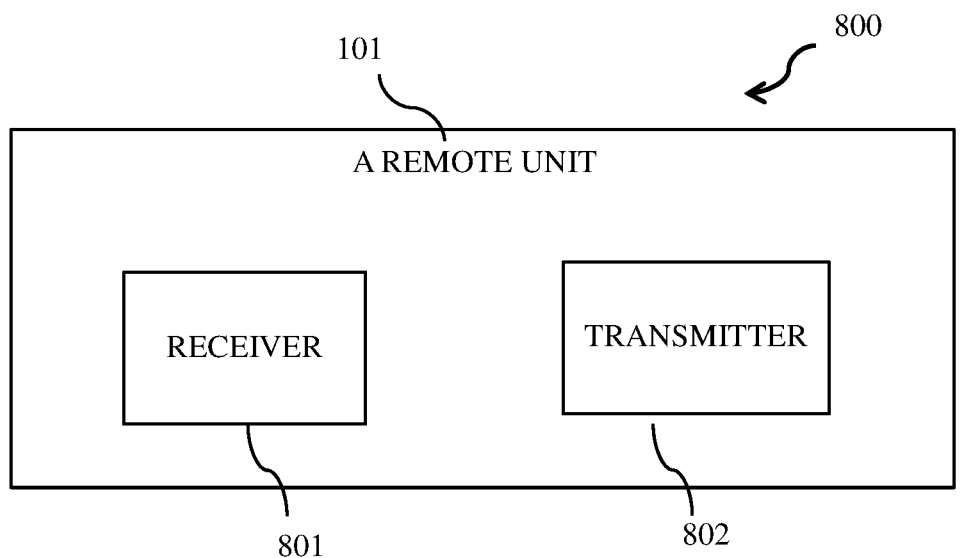
FIG. 8 illustrates an example block diagram of a remote unit according to an embodiment of the present application.

FIG. 8 illustrates an example block diagram of a remote unit according to an embodiment of the present application. The apparatus 800 in FIG. 8 includes one embodiment of the remote unit 101. Furthermore, the remote unit 101 may include a receiver 801 and a transmitter 802. In an embodiment, the receiver 801 and the transmitter 802 may be integrated into a single device, such as a transceiver. In certain embodiments, the remote unit 101 may further include an input device, a display, a memory, and/or other elements. In one embodiment, the receiver 801 receives a first control signal on a carrier within a carrier group in a slot, wherein the first control signal includes an indicator for indicating whether the carrier is a last scheduled carrier of the carrier group for downlink transmissions. The transmitter 802 transmits a HARQ-ACK codebook corresponding to the downlink transmissions in the slot for the carrier group, wherein, based on the first control signal, one or more HARQ-ACK bits for the last scheduled carrier are arranged at the end of the HARQ-ACK codebook. The apparatus 800 may further include a processor, which is used for determining a size of a HARQ-ACK codebook, constructing the HARQ-ACK codebook, or other processes performed in the apparatus 800. The functions and implementations of all elements in the apparatus 800 and definitions of related technical terms can refer to the specific descriptions of FIGS. 2, 3, and 5-7 and the foregoing corresponding paragraphs in this specification.

Figure 9:
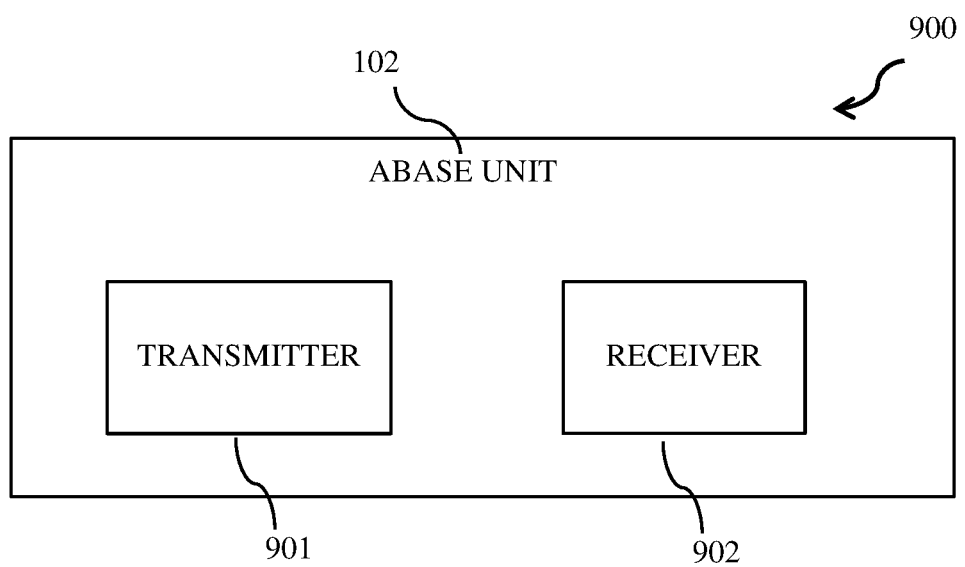
FIG. 9 illustrates an example block diagram of a base unit according to an embodiment of the present application.

FIG. 9 illustrates an example block diagram of a base unit according to an embodiment of the present application. The apparatus 900 in FIG. 9 includes one embodiment of the base unit 102. Furthermore, the base unit 102 may include a transmitter 901 and a receiver 902. In an embodiment, the transmitter 901 and the receiver 902 may be integrated into a single device, such as a transceiver. In certain embodiments, the base unit 102 may further include an input device, a display, a memory, and/or other elements. In one embodiment, a transmitter 901 transmits, to a remote unit, a first control signal on a carrier within a carrier group in a slot, wherein the first control signal includes an indicator for indicating whether the carrier is a last scheduled carrier of the carrier group for downlink transmissions. The receiver 902 receives a HARQ-ACK codebook corresponding to the downlink transmissions in the slot for the carrier group, wherein, based on the first control signal, one or more HARQ-ACK bits for the last scheduled carrier are arranged at the end of the HARQ-ACK codebook. The apparatus 900 may further include a processor, which is used for grouping carriers into different carrier groups, determining a size of a HARQ-ACK codebook, or other processes performed in the apparatus 900. The functions and implementations of all elements in the apparatus 800 and definitions of related technical terms can refer to the specific descriptions of FIGS. 3-7 and the foregoing corresponding paragraphs in this specification.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present application by simply employing the elements of the independent claims. Accordingly, the embodiments of the present application as set forth herein are intended to be illustrative, not limiting. Various changes may be made without departing from the spirit and scope of the present application.

In this document, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "including."

The following is what is claimed:

1. An apparatus comprising:
   a receiver that receives a first control signal on a carrier within a carrier group in a slot, wherein the first control signal includes an indicator for indicating whether the carrier is a last scheduled carrier of the carrier group for downlink transmissions; and
   a transmitter that transmits a hybrid automatic repeat request acknowledgement codebook corresponding to the downlink transmissions in the slot for the carrier group, wherein, based on the first control signal, one or more hybrid automatic repeat request acknowledgement bits for the last scheduled carrier are arranged at the end of the hybrid automatic repeat request acknowledgement codebook.

2. The apparatus of claim 1, wherein a plurality of hybrid automatic repeat request acknowledgement codebooks for a plurality of slots for the carrier group are concatenated and transmitted in one channel.

3. The apparatus of claim 2, wherein the concatenated hybrid automatic repeat request acknowledgement codebooks for the plurality of slots for the carrier group and another concatenated hybrid automatic repeat request acknowledgement codebooks for the plurality of slots for another carrier group are concatenated and transmitted in one channel.

4. The apparatus of claim 1, wherein the hybrid automatic repeat request acknowledgement codebook for the slot for the carrier group and another hybrid automatic repeat request acknowledgement codebook for the slot for another carrier group are concatenated and transmitted in one channel.

5. The apparatus of claim 1, wherein the carrier group comprises one or more carriers, and wherein a downlink transmission on each carrier within the carrier group is mapped to the same number of hybrid automatic repeat request acknowledgement bits.

6. The apparatus of claim 1, wherein the carrier group is based on the configured transport block based retransmission or code block group based retransmission.

7. The apparatus of claim 1, wherein the first control signal further includes a total downlink assignment index, and the value of the total downlink assignment index denotes a total number of one or more carriers for downlink transmissions in the slot across different carrier groups.

8. The apparatus of claim 7, wherein the first control signal further includes a counter downlink assignment index, and the value of the counter downlink assignment index denotes an accumulative number of carriers for downlink transmissions in the slot and in the carrier group.

9. The apparatus of claim 8, wherein the counter downlink assignment index is used to order hybrid automatic repeat request acknowledgement bits within the hybrid automatic repeat request acknowledgement codebook.

10. An apparatus comprising:
a transmitter that transmits a first control signal on a carrier within a carrier group in a slot, wherein the first control signal includes an indicator for indicating whether the carrier is a last scheduled carrier of the carrier group for downlink transmissions; and
a receiver that receives a hybrid automatic repeat request acknowledgement codebook corresponding to the downlink transmissions in the slot for the carrier group, wherein, based on the first control signal, one or more hybrid automatic repeat request acknowledgement bits for the last scheduled carrier are arranged at the end of the hybrid automatic repeat request acknowledgement codebook.

11. The apparatus of claim 10, wherein a plurality of hybrid automatic repeat request acknowledgement codebooks for a plurality of slots for the carrier group are concatenated and received in one channel.

12. The apparatus of claim 11, wherein the concatenated hybrid automatic repeat request acknowledgement codebooks for the plurality of slots for the carrier group and another concatenated hybrid automatic repeat request acknowledgement codebooks for the plurality of slots for another carrier group are concatenated and received in one channel.

13. The apparatus of claim 10, wherein the hybrid automatic repeat request acknowledgement codebook for the slot for the carrier group and another hybrid automatic repeat request acknowledgement codebook for the slot for another carrier group are concatenated and received in one channel.

14. The apparatus of claim 10, wherein the carrier group comprises one or more carriers, and wherein a downlink transmission on each carrier within the carrier group is mapped to the same number of hybrid automatic repeat request acknowledgement bits.

15. The apparatus of claim 10, wherein the carrier group is based on the configured transport block based retransmission or code block group based retransmission.

16. The apparatus of claim 10, wherein the first control signal further includes a total downlink assignment index, and the value of the total downlink assignment index denotes a total number of one or more carriers for downlink transmissions in the slot across different carrier groups.

17. The apparatus of claim 16, wherein the first control signal further includes a counter downlink assignment index, and the value of the counter downlink assignment index denotes an accumulative number of carriers for downlink transmissions in the slot and in the carrier group.

18. The apparatus of claim 17, wherein the counter downlink assignment index is used to order hybrid automatic repeat request acknowledgement bits within the hybrid automatic repeat request acknowledgement codebook.

19. A method comprising:
receiving a first control signal on a carrier within a carrier group in a slot, wherein the first control signal includes an indicator for indicating whether the carrier is a last scheduled carrier of the carrier group for downlink transmissions; and
transmitting a hybrid automatic repeat request acknowledgement codebook corresponding to the downlink transmissions in the slot for the carrier group, wherein, based on the first control signal, one or more hybrid automatic repeat request acknowledgement bits for the last scheduled carrier are arranged at the end of the hybrid automatic repeat request acknowledgement codebook.

20. A method, comprising:
transmitting a first control signal on a carrier within a carrier group in a slot, wherein the first control signal includes an indicator for indicating whether the carrier is a last scheduled carrier of the carrier group for downlink transmissions; and
receiving a hybrid automatic repeat request acknowledgement codebook corresponding to the downlink transmissions in the slot for the carrier group, wherein, based on the first control signal, one or more hybrid automatic repeat request acknowledgement bits for the last scheduled carrier are arranged at the end of the hybrid automatic repeat request acknowledgement codebook.

* * * * *